(12) United States Patent
White et al.

(10) Patent No.: US 10,435,093 B2
(45) Date of Patent: Oct. 8, 2019

(54) UTILITY VEHICLE CONFIGURABLE WORKSTATION

(71) Applicants: Michael White, Scottsdale, AZ (US); John Sido, Scottsdale, AZ (US); David Gronlund, Scottsdale, AZ (US)

(72) Inventors: Michael White, Scottsdale, AZ (US); John Sido, Scottsdale, AZ (US); David Gronlund, Scottsdale, AZ (US)

(73) Assignee: 19th HOLE CART LLC, Scottsdale, AZ (US)

( * ) Notice: Subject to any disclaimer, the term of this patent is extended or adjusted under 35 U.S.C. 154(b) by 596 days.

(21) Appl. No.: 14/995,632

(22) Filed: Jan. 14, 2016

(65) Prior Publication Data

US 2016/0200261 A1    Jul. 14, 2016

Related U.S. Application Data

(60) Provisional application No. 62/103,407, filed on Jan. 14, 2015.

(51) Int. Cl.
*B62D 65/02* (2006.01)
*B62D 39/00* (2006.01)
*B60R 9/06* (2006.01)

(52) U.S. Cl.
CPC .............. *B62D 65/02* (2013.01); *B60R 9/065* (2013.01); *B62D 39/00* (2013.01)

(58) Field of Classification Search
CPC ........ B62D 65/02; B62D 39/00; B60R 9/065; B60R 9/00; B60R 9/06
See application file for complete search history.

(56) References Cited

U.S. PATENT DOCUMENTS

| | | | | |
|---|---|---|---|---|
| D432,363 S | * | 10/2000 | Bassford | D7/605 |
| D463,999 S | * | 10/2002 | Beck | D12/16 |
| 9,260,061 B1 | * | 2/2016 | Rudd | B60R 9/065 |
| 9,623,808 B2 | * | 4/2017 | Bonenberger | B60R 9/065 |
| 2002/0024272 A1 | * | 2/2002 | Eschenfelder | A47B 87/02 312/100 |
| 2007/0023466 A1 | * | 2/2007 | Policastro | B60R 9/00 224/42.39 |
| 2014/0203584 A1 | * | 7/2014 | White | B60P 3/0257 296/22 |
| 2014/0217139 A1 | * | 8/2014 | Bonenberger | B60R 9/065 224/274 |
| 2017/0197556 A1 | * | 7/2017 | Bonenberger | B60R 9/065 |

* cited by examiner

*Primary Examiner* — Corey N Skurdal
(74) *Attorney, Agent, or Firm* — Schmeiser, Olsen & Watts LLP

(57) ABSTRACT

Disclosed is a configurable workstation for coupling to a utility vehicle. The workstation allows for fast, simple, and secure mounting to the utility vehicle by way of a conforming surface engaging with the utility vehicle's rear platform or bagwell. The workstation is configurable in a number of customized forms depending on the use requirements of the utility vehicle and workstation and may include drawers, an interchangeable work surface with or without a backsplash, cabinets, or bins in many different combinations. Examples of the interchangeable work surface include a countertop, a wooden or metal workbench, and other removable and exchangeable work surfaces according to the application desired.

16 Claims, 10 Drawing Sheets

UTILITY VEHICLE CONFIGURABLE WORKSTATION

CROSS REFERENCE TO RELATED APPLICATION[S]

This application claims priority to U.S. Provisional Patent Application entitled "UTILITY VEHICLE CONFIGURABLE WORKSTATION," Ser. No. 60/103,407, filed Jan. 14, 2015, the disclosure of which is hereby incorporated entirely herein by reference.

BACKGROUND OF THE INVENTION

Technical Field

This invention relates to configurable workstations for utility vehicles; specifically, the invention relates to workstations which are coupled to a golf cart or other utility vehicle for use in storing, transporting, and dispensing food items or other concessions, and for provision of tools, spare parts, and a portable work surface for multiple applications.

State of the Art

Utility vehicles are widely used worldwide in commercial and recreational settings. Maintenance workers, factory and warehouse personnel, managers of apartments and other properties, golfers, and others utilize small electric and gasoline-powered utility vehicles in any number of settings for fast and convenient transportation around a worksite, golf course, or other location. Utility vehicles, however, have limited options for storage and transport of supplies, tools, and other small items used by workers, golfers, and various other users. Moreover, small utility vehicles do not provide a workbench or other surface to facilitate repairs and other work performed in widely separated locations where persons would use a utility vehicle for transportation around a large indoor or outdoor worksite, or other facility.

Golfing, for example, is a popular sport worldwide. Each golfer may spend anywhere from an hour to several hours on the golf course for each round of golf. There is a growing need for food, beverages, and other supplies to be provided to the golfers while they are on the golf course. Also, golf is frequently a social activity shared between four or more people or couples. Golfers enjoy beverages and snacks while on the golf course. Golfers often need to access extra golf supplies, clothing, and other various items while out on the golf course. These supplies and other items require convenient storage, portability, and easy access by golfers while out golfing.

Accordingly, what is needed is a utility vehicle, such as a golf cart, with customizable, interchangeable, mobile features, such as an interchangeable workbench or other worksurface equivalent, which can be easily moved around a large site, like a golf course or warehouse, and can supply personnel or sportsmen with supplies, tools, and other items.

DISCLOSURE OF THE INVENTION

This invention relates to configurable workstations for utility vehicles; specifically, the invention relates to configurable workstations with an interchangeable work surface and customizable storage compartments which is quickly and securely coupled to the utility vehicle.

And embodiment includes a utility vehicle configurable workstation comprising a mounting body with an opening and an inner volume; and a module inserted through the opening into the inner volume bounded by the mounting body, wherein the mounting body engages with a utility vehicle rear platform surface.

Another embodiment includes a golf cart with a configurable workstation comprising a golf cart having a rear platform and a bagwell formed in the rear platform; a removable, modular workstation comprising: a mounting body with an opening, an inner volume and a bagwell interlock; and a module inserted through the opening into the inner volume bounded by the mounting body, wherein the bagwell interlock of the mounting body engages the bagwell of the golf cart to secure the workstation to the golf cart.

Yet another embodiment includes a method of coupling a configurable workstation to a golf cart, the method comprising inserting a workstation bagwell interlock into a bagwell of a rear platform surface of a golf cart; and coupling a workstation compression mount to a canopy support of the golf cart.

The foregoing and other features and advantages of the invention will be apparent to those of ordinary skill in the art from the following more particular description of the invention and the accompanying drawings.

BRIEF DESCRIPTION OF THE DRAWINGS

Some of the embodiments will be described in detail, with reference to the following figures, wherein like designations denote like members.

DETAILED DESCRIPTION OF EMBODIMENTS OF THE INVENTION

A detailed description of the hereinafter described embodiments of the disclosed apparatus and method are presented herein by way of exemplification and not limitation with reference to the Figures listed above. Although certain embodiments are shown and described in detail, it should be understood that various changes and modifications may be made without departing from the scope of the disclosure. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification, the singular forms "a," "an," and "the" include plural referents, unless the context clearly dictates otherwise.

As mentioned above, the disclosed invention relates to configurable workstations for utility vehicles; specifically, the invention relates to workstations which are coupled to a golf cart or other utility vehicle for use in storing, transporting, and dispensing food items or other concessions, provision of tools and/or spare parts, and a portable counter or other work surface.

One example of a utility vehicle utilizing a configurable storage unit is a golf cart. Golf is a social game, often played by two or more couples or "twosomes." Where four or more players are out on the course together for many hours, refreshment in the form of beverages and food is desirable and adds additional pleasure to the golf experience. Because a typical golf cart has no storage space for transporting items other than people and golf club bags, players necessarily store canned beverages, packaged snacks, golf supplies such as extra balls and tees, and other small items within compartments built into golf club bags and clothing pockets on the player's person. This small amount of available space necessarily limits the nature and quantity of refreshments and other items which can be conveniently brought with the players onto the golf course. Also, a typical golf cart has no work surface, such as a counter, for preparation and serving of food. Golf carts, however, all have a fairly large area at the rear of the cart, behind the bench seat, where the golf bags are stored, often in depressions within the portion of the vehicle floorboard extending behind the seat bench known as the rear platform and/or bag wells.

Generally, a utility vehicle configurable workstation 100 is designed with several particular purposes which include provision of: 1) a simple, secure mounting device for coupling a configurable workstation to a utility vehicle; 2) a customized, interchangeable work surface; and 3) customized, interchangeable storage options including a removable module.

Figure 1:
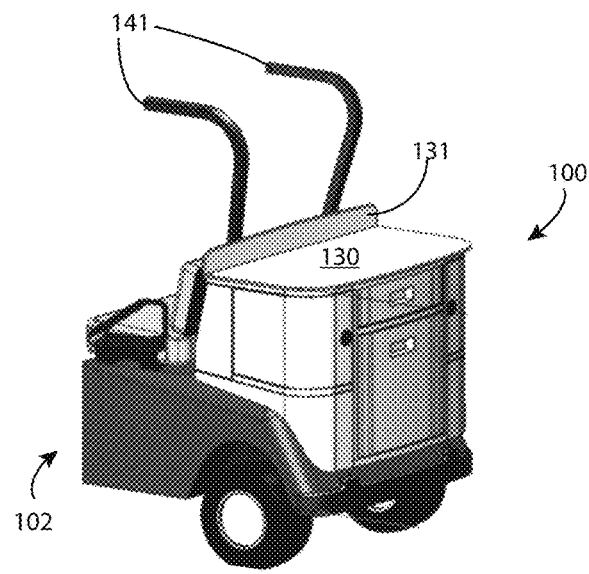
FIG. 1 is a rear perspective view of an embodiment of a configurable workstation coupled to a utility vehicle.

Referring to the several drawing, figures FIG. 1 shows a rear perspective view of an embodiment of a configurable workstation 100, according to the invention, coupled to a utility vehicle 102. Utility vehicle 102 in this and other embodiments shown in the Figures is a golf cart, although this is in no way meant to be limiting. Utility vehicle 102 may be electric/battery powered or gasoline powered. Some non-limiting examples of utility vehicle 102 include various carts for transportation of personnel and materials around a warehouse, a construction job site, an apartment complex, other large property site, or a factory. FIG. 1 shows the general relationship between workstation 100 and utility vehicle 102 when these two structures are coupled together. As FIG. 1 shows, workstation 100 is mounted to the rear and, in some embodiments, coextensive with a seat back of vehicle 102, and rests on a rear platform (not shown) of vehicle 102 generally centered over the rear wheels of vehicle 102. This arrangement allows for storage and transport of a load comprising items such as tools, supplies, foodstuffs, and the like centered low and over the rear wheels of vehicle 102. Such an arrangement tends to stabilize a moving utility vehicle by keeping the transported load's center of gravity as low as possible and centering the load over vehicle 102's drive wheels to improve traction. Stability is important when vehicle 102 and workstation 100 are used outdoors on uneven, undeveloped grades and surfaces such as grass, dirt, mud, or an unimproved golf-cart path. Also shown by FIG. 1 are a work surface 130, a backsplash 131, and various drawers, bins, and cabinets are shown in the depicted embodiment which will be discussed in detail herein below.

Material used in construction of workstation 100 are those materials typically uses for manufacture of outdoor or indoor workstations and utility vehicles, including but not limited to steel, stainless steel, aluminum, plastics and other synthetic polymers, rubber and other natural and synthetic rigid or elastomeric materials, and the like. Where the choice of material/materials for construction of a particular element of workstation 100 is relevant, additional discussion is provided herein below. Otherwise, this list is by example only and is not intended to be limiting.

Workstation 100, in some embodiments, includes a mounting body. Mounting body couples workstation 100 to utility vehicle 102, in some embodiments, by way of a bagwell interlock 111 and a conforming surface 106, which are discussed herein below.

Figure 2:
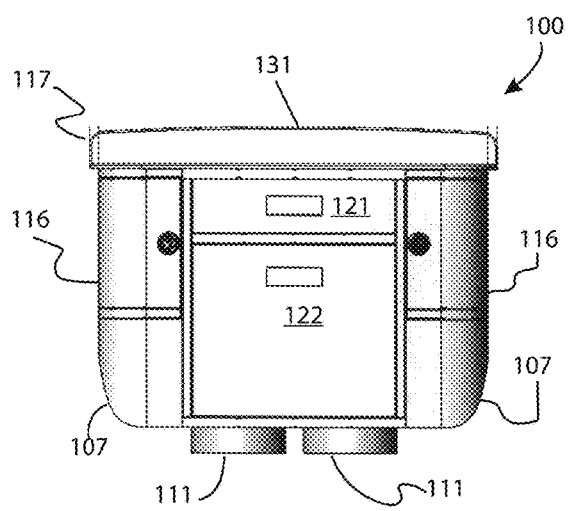
FIG. 2 is a rear elevation view of an embodiment of configurable workstation.

FIG. 2 shows a rear elevation view of an embodiment of configurable workstation 100, according to the invention. Shown in FIG. 2 are bagwell interlock 111, a fairing 107, a side cabinet 116, a bin 122, a drawer 121, backsplash 131, and work surface 130. Bin 122 and drawer 121, in this and some other embodiments, comprise a removable module 120 (see FIG. 8 and FIG. 10). Removable module 120 is one way wherein workstation 120 may be customized to suit a variety of applications and will be discussed in additional detail herein below. In addition to removable module 120, FIG. 2 shows two side cabinets 116. Side cabinet 116 is an additional customizable storage module which may be designed according to the needs of the particular setting in which workstation 100 is used. Some embodiments of the invention include one side cabinet 116. Some embodiments include two, as in the embodiment shown in FIG. 2, and allow for a symmetrical appearance and weight-distribution. Some embodiments do not have side cabinet 116, which is optional according to the intended application of workstation 100. In some embodiments, side cabinet 116 comprises a first handle 117. In some embodiments, first handle 117 is a locking-latch handle, wherein side cabinet 116 may be locked to secure the contents from theft or to prevent side cabinet 116 from accidentally opening and spilling items contained within side cabinet 116 from workstation 100 when utility vehicle 102 is driven over rough or uneven surfaces or terrain.

Also shown by FIG. 2 are two fairings 107. Fairing 107, in some embodiments, is a weight-bearing support for side cabinet 116. In some embodiments (now shown), fairing 107 may be fitted with an access portal for utilization of additional storage space between the rear wheel well of utility vehicle 102 and mounting body 110. In some embodiments, fairing 107 is merely ornamental. Some embodiments of the invention do not comprise fairing 107.

Work surface 130, in some embodiments, is designed to be removable and interchangeable, as will be discussed in further detail herein below. Work surface 130 is selected according to the desired application of workstation 100, according to the invention. For example, in applications wherein workstation 100 is coupled to a golf cart, work surface 130 may be a countertop or cutting-board for preparation of food, such as sandwiches and the like. Wherein workstation 100 is coupled to utility vehicle 102 used by maintenance personnel at an apartment complex, factory, or other site whether indoors or outdoors, work surface 130 may comprise a wooden or steel/metal workbench. In this way, work surface 130 is a portable surface which is moved, along with workstation 100, to a location where it will be used. This may obviate the need to remove a part or component needing repair from a larger machine or device by providing a work surface needed to perform the repair to the location of the larger machine or device, thereby possibly shorting the time necessary to perform the repair and increasing workplace efficiency. In another example, apartment maintenance personnel may transport work surface 130 with workstation 100 coupled to utility vehicle 102 to a particular apartment within a large, multi-building apartment complex. The maintenance personnel goes into the apartment, removes a damaged item (such as a wooden molding, for example) and then used work surface 130 to either repair the item or to cut/size and/or tailor a replacement item immediately outside of the apartment, thereby limiting mess and disruption within the apartment while still saving time by providing a system for major elements of the repair to be performed at a portable workstation nearby the apartment rather than at a fixed, centralized workshop or location remote from the apartment. In some embodiments, work surface 130 accommodates mounting of a vise, claim, chop saw, grinding wheel, or any other bench-mounted tool.

Backsplash 131 (shown in FIGS. 1-8, FIG. 10, and FIG. 11) may be a unitary body with work surface 130, a separate component, or absent entirely in some embodiments of the invention. The configuration of backsplash 131 is tailored according to the application requirements wherein workstation 100 is used. Backsplash 131 may comprise the same or different material as work surface 130.

Figure 3:
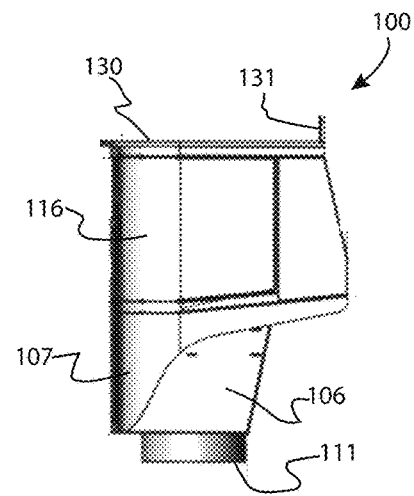
FIG. 3 is a side elevation view of configurable workstation.

FIG. 3 shows a side elevation view of configurable workstation 100, according to the invention. In addition to elements seen in FIG. 1 and FIG. 2, FIG. 3 shows a conforming surface 106. Conforming surface 106, in some embodiments of the invention, engages the inner side surfaces of a rear body recess of utility vehicle 102 and is part of the coupling device by which workstation 100 engages utility vehicle 102. Conforming surface 106 comprises a panel shaped and curved to engage a corresponding inner side surface of the rear body recess found in most utility vehicles. When utility vehicle 102 is a golf cart, secondary recesses 150 may be present in the floor of the rear body recess to accommodate golf bags and are commonly known as "bagwells." (See FIG. 11). Embodiments of the invention exploit the overall shape of utility vehicle 102's rear body recess, including bagwells 150 where present, to removably couple and/or engage, support, and stabilize workstation 100. Accordingly, conforming surface 106 is shaped to mirror the opposing surface of utility vehicle 102, in some embodiments of the invention. When conforming surface 106 is shaped thusly, workstation 106 is stabilized on utility vehicle 102 and does not noticeably shift on vehicle 102 when vehicle 102 is driven over steep grades, uneven surfaces, or rough terrain. A stable coupling of workstation 100 to utility vehicle 102 is important for optimal safety and stability during operation of utility vehicle 102. Typically, a way of fixedly coupling a storage container to a utility vehicle, such as bolts, rivets, screws, other fasteners, or welding to the vehicle frame is necessary to achieve an equal degree of stability as can be achieved utilizing properly shaped conforming surface 106 in concert with bagwell interlock 111 and compression mount 140 (not shown in FIG. 3; see FIG. 13) present in some embodiments of the invention.

Figure 4:
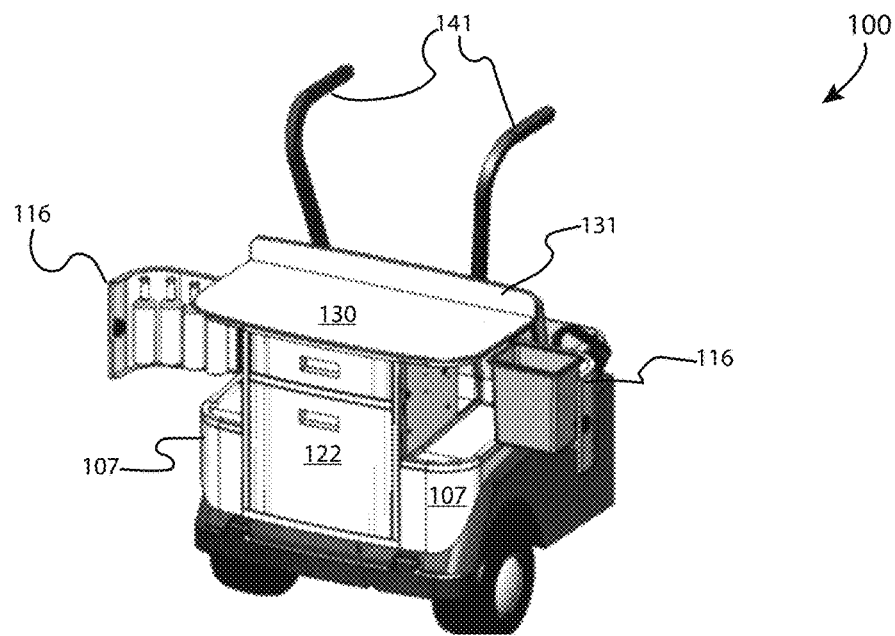
FIG. 4 is a rear perspective view of configurable workstation coupled to utility vehicle.
Figure 5:
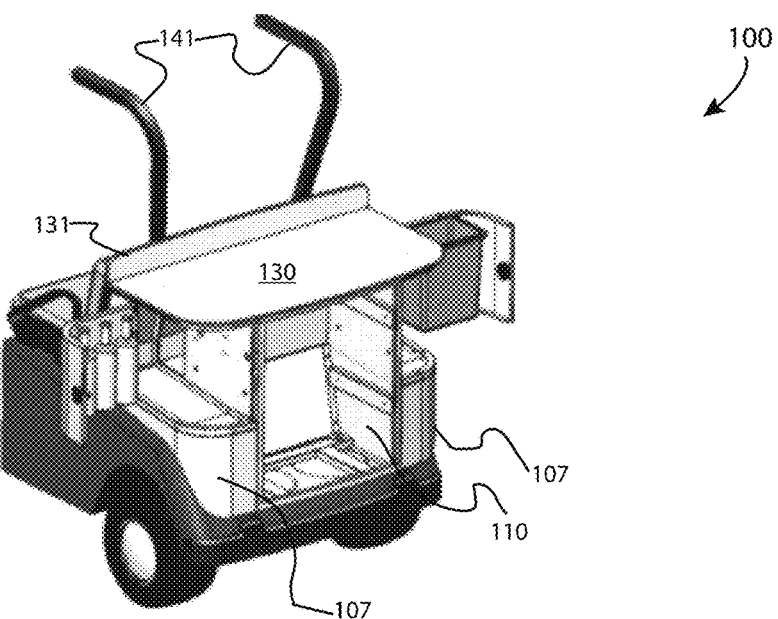
FIG. 5 is a rear perspective view of configurable workstation.

FIG. 4 and FIG. 5 show a right-rear perspective view and a left-rear perspective view respectively of configurable workstation 100 coupled to utility vehicle 102, according to the invention. The embodiment of workstation 100 shown in FIG. 4 comprises two open side cabinets 116, opened to show two example interior configurations of side cabinet 116. On the left side cabinet 116 shown in FIG. 4 and FIG. 5, there are recesses in the cabinet door for bottles. These may be beverage bottles, including water, soda, or liquor. The embodiment shown is by way of example only. The door of side cabinet 116 may, if desired by the user, comprise recesses for stowing tools, supplies, or other articles for stable storage during operation of vehicle 102 and ready-access upon arrival at the worksite. On the right side cabinet 116 shown in FIG. 4 and FIG. 5 is a wastebasket mounted on the door. Again, this is only an example. A tool bin, multi-bin drawer organizer, or any other similar workstation may also be mounted on the door of any side cabinet 116 to best suit the intended application for workstation 100, in some embodiments of the invention.

Figure 10:
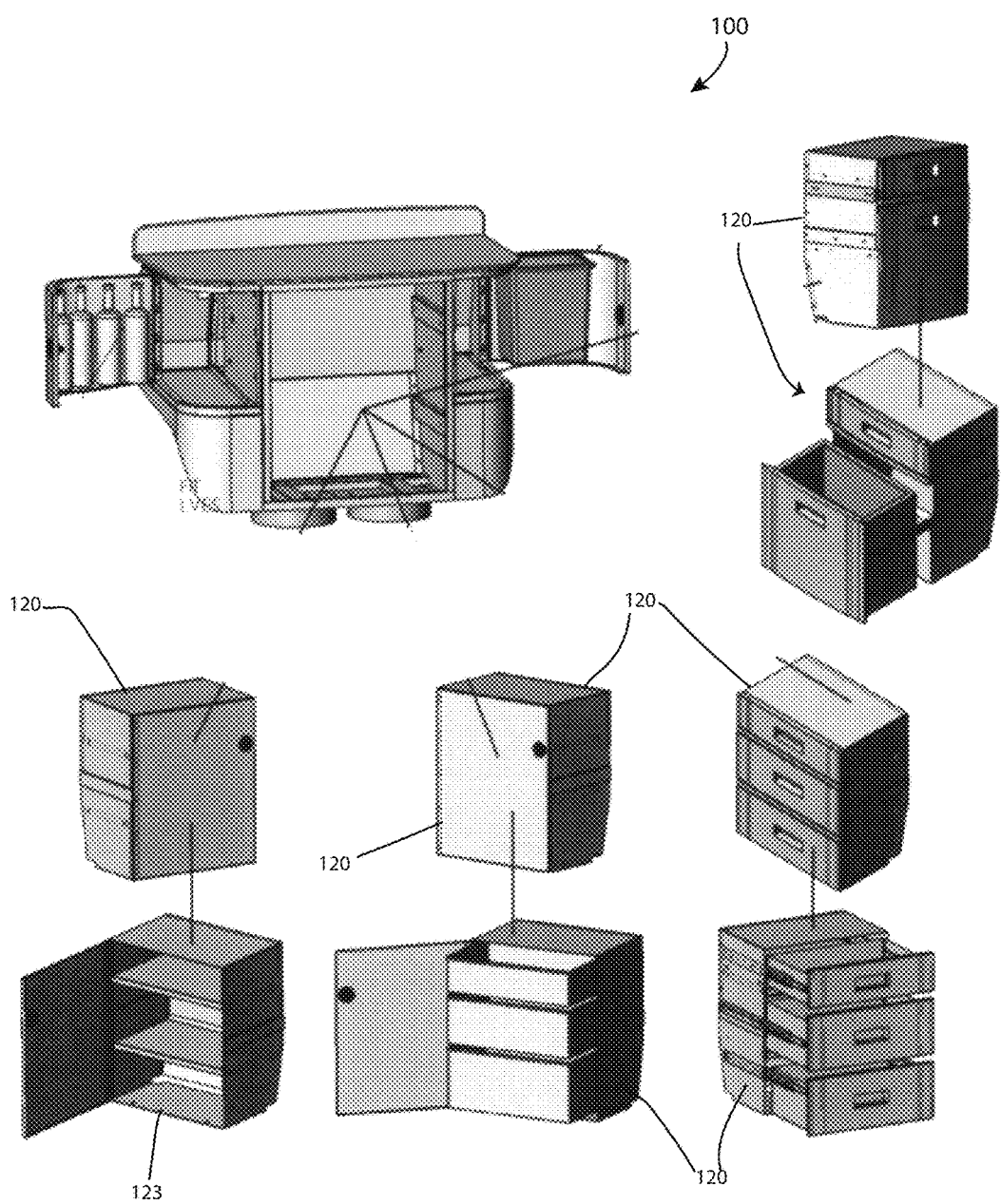
FIG. 10 is a rear perspective view of mounting body, including bagwell interlock and two side cabinets, and a collection of several example embodiments of a removable module.

FIG. 5 shows workstation 100 absent removable module 120. Frame members of mounting body 110 are shown bounding a space which encloses removable module 120. As FIG. 5 shows, removable module 120 (some examples of which are shown in FIG. 10) is housed centrally within mounting body 110 generally along the centerline of vehicle 102 when workstation 100 is coupled to vehicle 102. Removable module 120, in some embodiments, typically extends lower in vehicle 102 with respect to the ground than side compartment 116 which is located over a vehicle wheel when workstation 100 is coupled to vehicle 102. The central and lower position of removable module 120 allow for placement of heavier loads, such as tools, supplies, or food containers like a metal beverage keg, in removable module 120. Low/central storage of stored items lowers the center of gravity of coupled workstation 100 and utility vehicle 102 low and properly distributes weight at the vehicle centerline for improved stability and traction when operating vehicle 102.

FIG. 4 and FIG. 5 also show fairing 107 partially supporting side cabinet 116 and generally providing a smooth appearance of the workstation 100/vehicle 102 coupled unit. A canopy support 141 of vehicle 102 is also shown. Canopy support 141 is an additional mounting device for workstation 100, in some embodiments, by mechanisms which are discussed further herein below.

Figure 6:
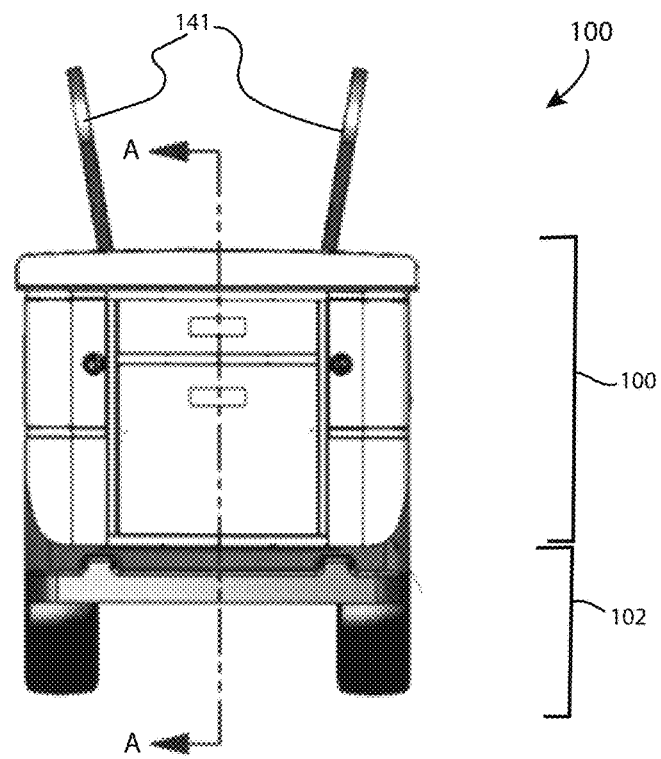
FIG. 6 is a rear elevation view of configurable workstation coupled to utility vehicle.
Figure 7:
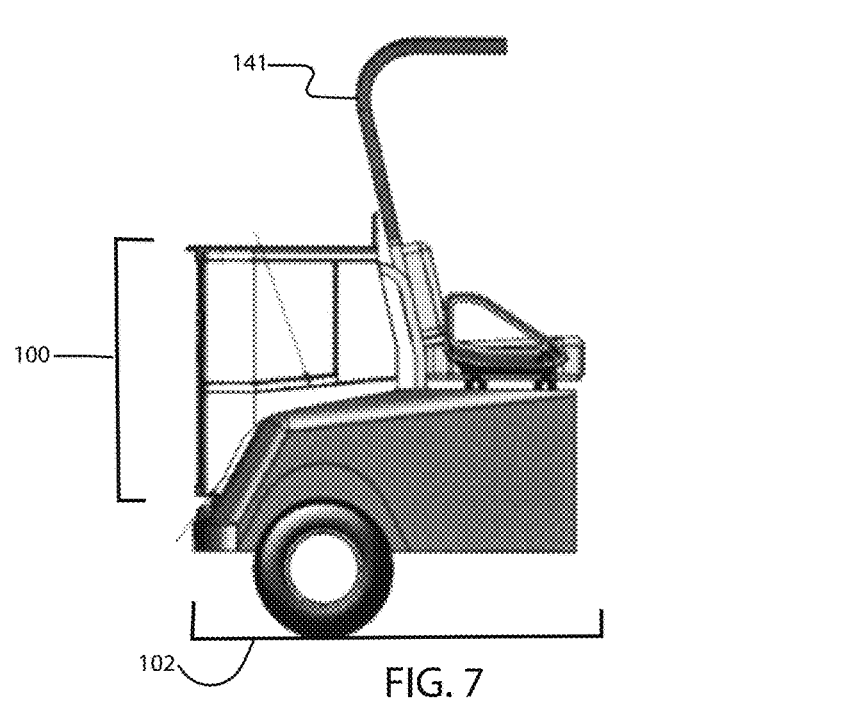
FIG. 7 is a right side elevation view of configurable workstation 100 coupled to utility vehicle.

FIG. 6 is a rear elevation view of configurable workstation 100 coupled to utility vehicle 102, according to the invention. Additionally, FIG. 6 shows the shape of workstation 100, in some embodiments, generally bounding a maximal amount of overall storage space while generally conforming to the outer lines of vehicle 102 for stability when operating vehicle 102. FIG. 7 similarly shows the relationship of the outer shape of workstation 100 generally matching the rear-extent of vehicle 102, in some embodiments.

Figure 8:
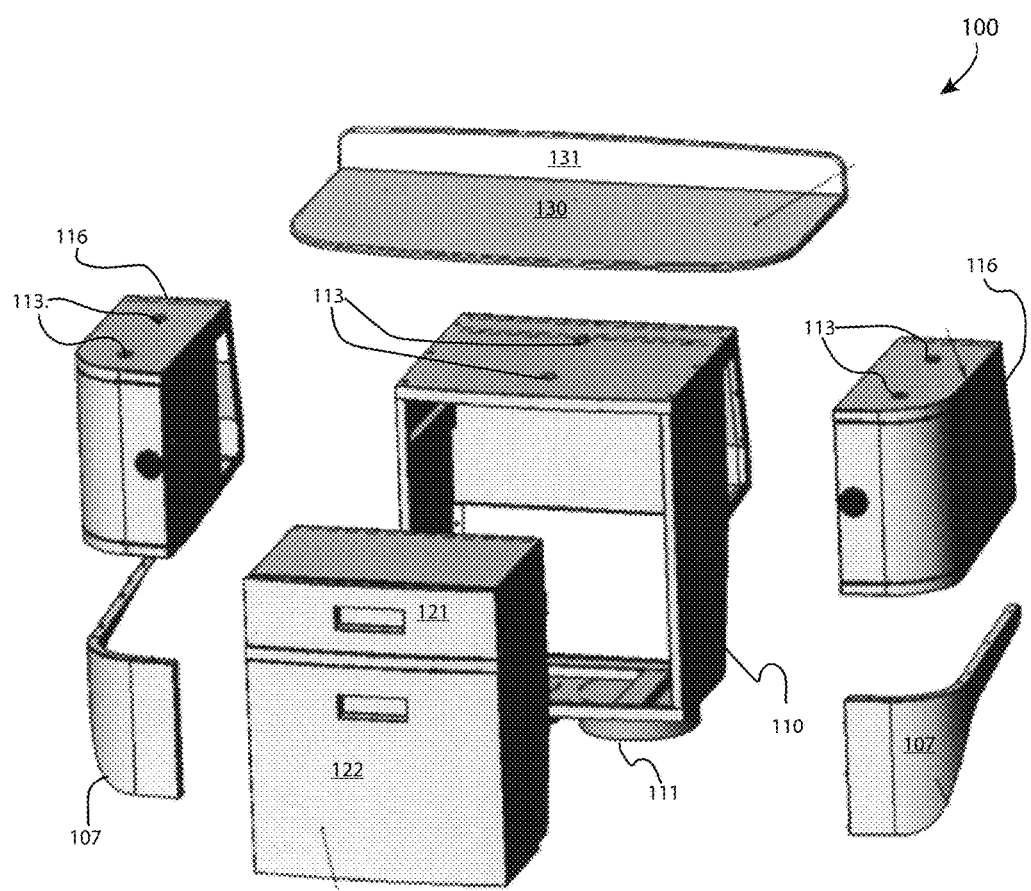
FIG. 8 is an exploded rear perspective view of an embodiment of configurable workstation.

FIG. 8 shows an exploded rear perspective view of an embodiment of configurable workstation 100, according to the invention. Mounting body 110 is shown separate from side cabinet 116, removable module 120, and work surface 130/backsplash 131 in the embodiments represented by FIG. 8. Mounting body 110, in some embodiments, is the supporting framework for workstation 100. Mounting body 110 engages utility vehicle 102 with bagwell interlock 111 (in some embodiments where present) and conforming surface 106, in some embodiments. Mounting body 110, with or without attached side cabinet(s) 116, work surface 130, and fairing(s) 107 slides into a rear body recess of utility vehicle 102 and rests on a rear platform within the rear body recess. The coupling of mounding body 110 with conforming surface(s) 106 to vehicle 102 can be performed in seconds by a single person, yet is secure and stable because the bottom and sides of workstation 100 are matched to the shape of utility vehicle 102, particularly when a bagwell interlock 111 is used. Mounting body 110 then serves as a secure platform upon which to customize workstation 100 by the addition of side cabinets(s) 116, a removable module 120, and a customized work surface 130, in some embodiments, according to the desired end usage and application of workstation 100 as discussed herein above.

In some embodiments, an upper surface of mounting body 110 comprises a recess 113 for alignment and mounting of work surface 130 and/or removable module 120. In some embodiments comprising recess 113, an underside of work surface 130 may comprise a protrusion 114 (not shown) wherein protrusion 114 engages recess 113 and tends to prevent misalignment or movement of work surface 130 on mounting body 110. In some embodiments, side cabinet(s) 116 also comprise recesses(s) 113 which receive protrusion(s) 114 on work surface 130. By utilizing a plurality of recesses 114 and corresponding protrusions 114 arranged in a pattern, work surface 130 is maintained in proper alignment atop mounting body 110 and side cabinets 116, in some embodiments. Additional fasteners, such as srews, bolts, and the like; clips, brackets, or similar fasteners may also be used in some embodiments to couple work surface 130 to mounting body 110 and side cabinets 116. In some embodiments, mounting body 110 and/or side cabinets 116 comprise protrusions and work surface 130 comprises corresponding recesses. In some embodiments, mounting body 110, side cabinet(s) 116 and work surface 130 have any combination of recesses and protrusions, including both a recess and a protrusion on any of mounting body 110, side cabinet(s) 116, and work surface 130. Recess 113 and protrusion 114 are one example of an interlocking system for alignment and fixation of work surface 130 to mounting body 110 and side cabinet(s) 116, however this is not meant to be limiting and these elements are not necessarily present on all embodiments of the invention. Some embodiments may use other related but not equivalent systems, such as pegs-and-holes for example. Some embodiments may not use any fixation and alignment system. Some embodiments comprise a fixation-and-alignment system for work surface 130 but not removable module 120. Some embodiments comprise a fixation-and-alignment system for removable module 120 but not for work surface 130.

Figure 9:
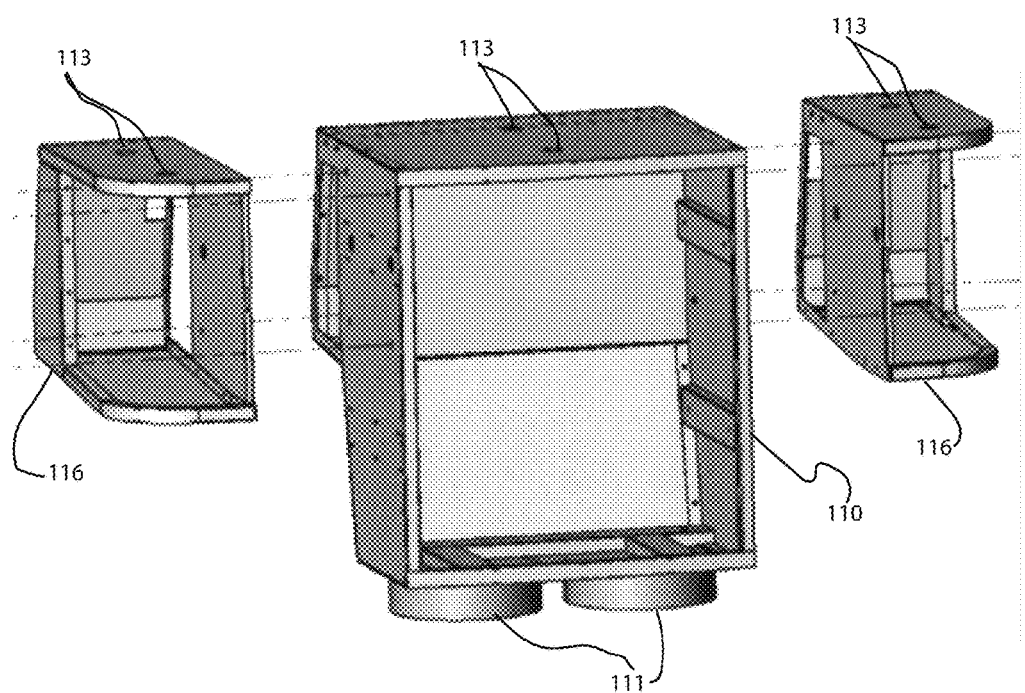
FIG. 9 is an exploded rear perspective view of a mounting body, including a bagwell interlock and two side cabinets.

FIG. 9 shows an exploded rear perspective view of a mounting body 110 including bagwell interlock 111 and two side cabinets 116, according to the invention. Side cabinet(s) 116 are coupled to mounting body 110 using suitable fasteners, such as bolts, screws, rivets, or the like, in some embodiments. In some embodiments, recess 113 and protrusion 114, in any suitable corresponding number and arrangement, are used to properly align side cabinet 116 on mounting body 110.

FIG. 10 shows a rear perspective view of mounting body 110 including two side cabinets 116 and some example embodiments of removable module 120, according to the invention. Removable module 120 may be customized in any suitable configuration tailored to the specific intended use of workstation 100. Removable module 120 slides through a rear opening into a central space bounded by mounting body 110 as shown in FIG. 10. Removable module 120 may comprise a rear cabinet 123, drawer 121, and bin 122. Removable module 120 may comprise one, two, several, or none of rear cabinet 123, drawer 121, and bin 122 in any desired configuration. In some embodiments, workstation 100 comprises a plurality of removable modules 120 with similar of different configurations of rear cabinet 123, drawer 121, and bin 121. In this manner, the user may have several removable modules 120 loaded and ready to be interchanged within mounting body 110 making a single workstation 100 suitable for multiple different applications. For example, a user responsible for factory maintenance may keep one removable module 120 configured and stocked with tools and parts for carpentry repairs, a second removable module 120 configured and stocked with tools and parts for machine-shop repairs, and one or more other removable module(s) 120 configured and stocked with tools and parts for repair of specific machines or groups of related machines within the factory. Thus, removable module 120 allows for a plethora of configurations of workstation 100, some examples of which are shown in FIG. 10, which may be readily customized and exchanged as the user's needs dictate.

Figure 11:
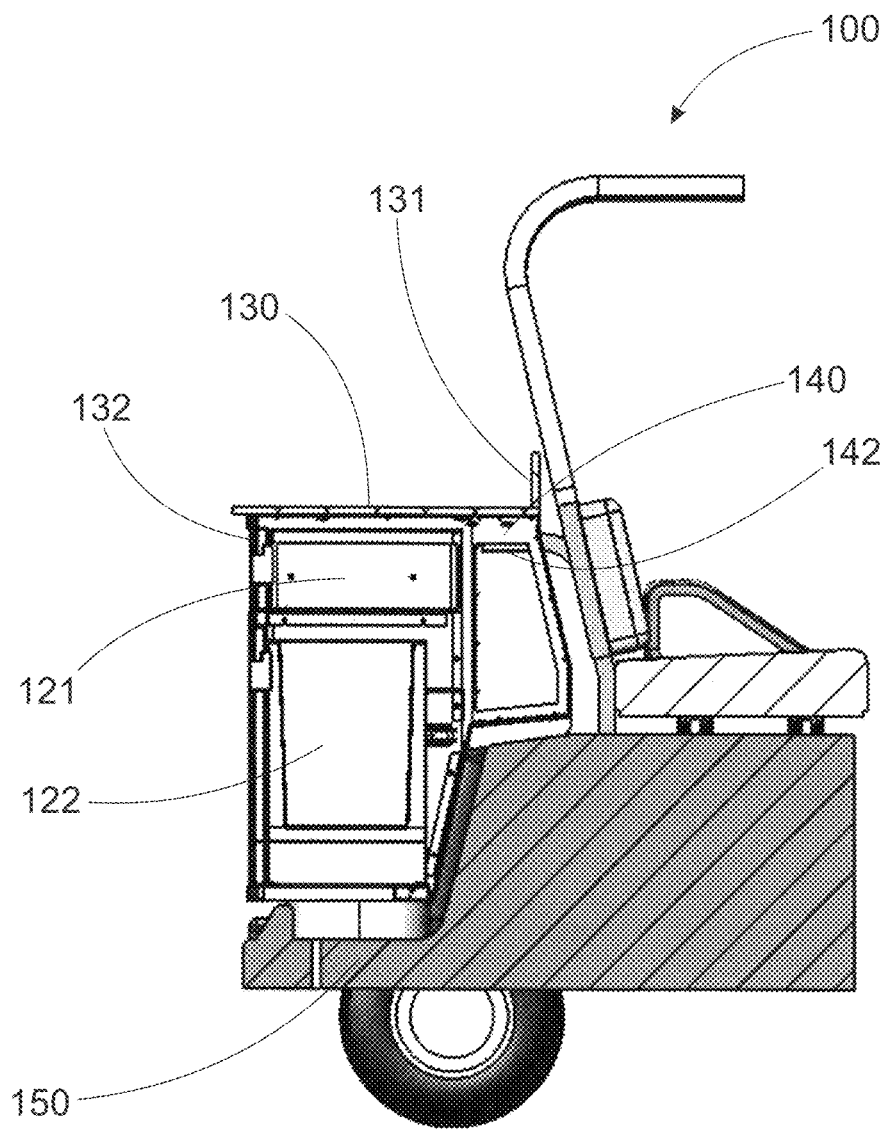
FIG. 11 is a sectional an embodiment of configurable workstation taken along line A-A of FIG. 6.

FIG. 11 shows a sectional view through line A-A of FIG. 6. Mounting body with bagwell interlock 111 encloses a removable module 120 comprising one drawer 121 and one bin 122, in the embodiment shown. Bagwell interlock 111 is inserted within and thereby coupled to bagwells 150 of utility vehicle 102 that is a golf cart. Further, surface 140 engages bag coupling extensions 142. In some embodiments, surface 140 may be secured to bag coupling extensions 142 of the golf cart 102. In some embodiments, drawer 121 and/or bin 122 and/or side cabinet 116 (not shown in FIG. 11) and/or rear cabinet 123 (not shown in FIG. 11) comprise a latch closing device wherein the closing device resists opening of the particular compartment when utility vehicle 102 is being driven over uneven surfaces, grades, or rough terrain. In some embodiments, the closing device may further comprise a lock, wherein a key, input of a combination, electronic key, or other security device is necessary to access the drawer 121, bin 122, side cabinet 116, or rear cabinet 123. FIG. 11 also shows the relationship of work surface 130 and backsplash 131 to mounting body 110. A fastener 132, in some embodiments, is used to couple work surface 130 to mounting body 110. Fastener 132 may be a screw, a bolt, or the like as further discussed herein below. In embodiments, bagwell interlock 111 operates as a sole connection and securing device to retain the workstation 100 in the golf cart 102 by engaging the bagwell 150.

Figure 12:
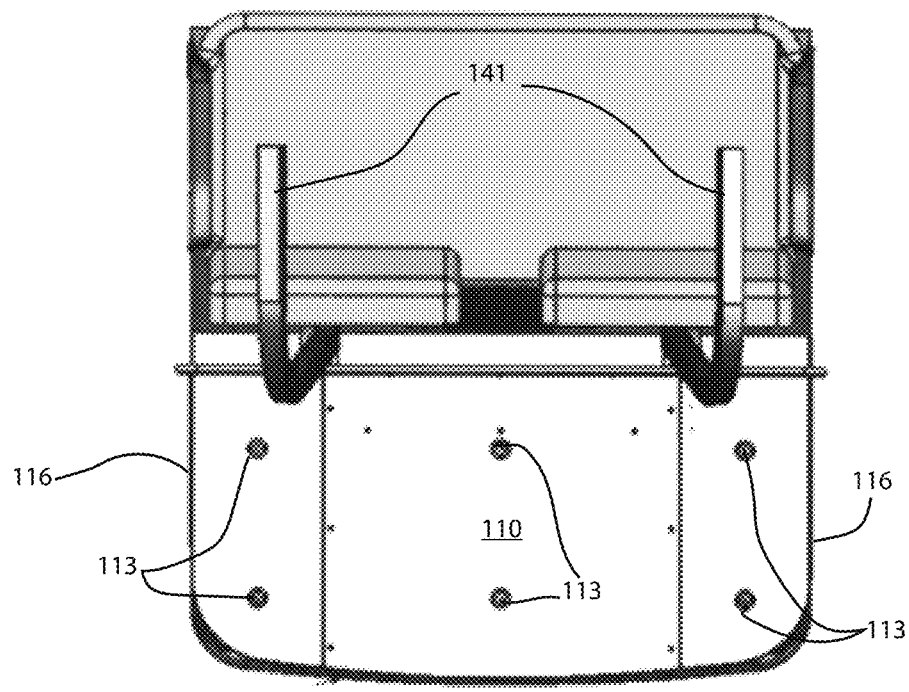
FIG. 12 is a top view of an embodiment of configurable workstation, according to the invention, coupled to utility vehicle.

FIG. 12 shows a top view of an embodiment of configurable workstation 100, according to the invention, coupled to utility vehicle 102. Work surface 130 has been removed from workstation 100 to reveal mounting body 110 and two side cabinets 116. In the embodiment shown, each of the two side cabinets 116 and mounting body 110 comprise two recesses 113. In this and some other embodiments, each recess 113 receives a corresponding protrusion 114 on an underside of work surface 130 as discussed herein above. In some embodiments, each recess and each corresponding protrusion additionally comprises an opening to receive fastener 132. Fastener 132 may be any suitable fastener, examples of which include a screw a bolt, a clip, or the like, according to the nature and composition of work surface 130. FIG. 12 also shows the relationship of workstation 100 to the seat back and canopy supports 141 of utility vehicle 102.

Figure 13:
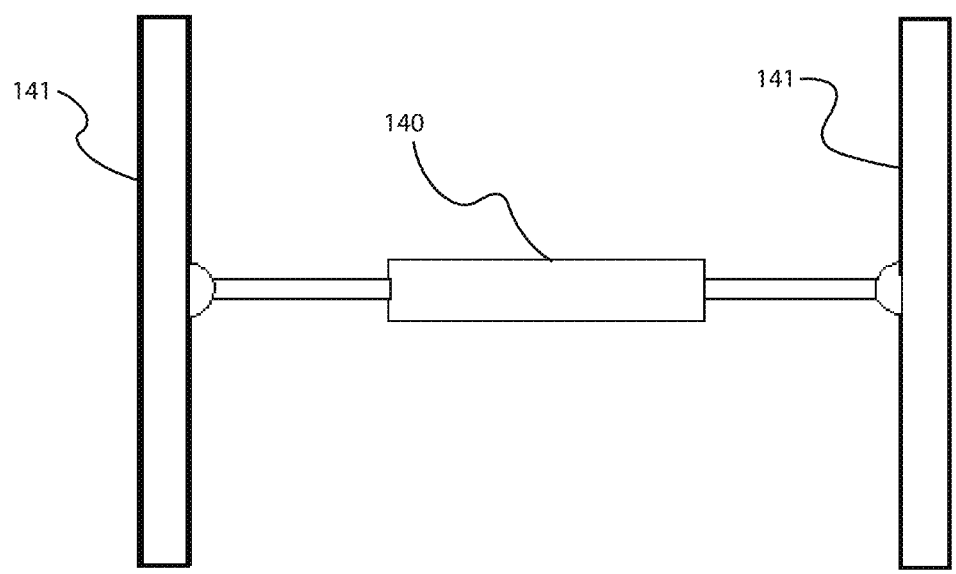
FIG. 13 is a rear elevation view of one embodiment of a compression mount.

FIG. 13 shows a rear elevation view of one embodiment of compression mount 140, according to the invention. Compression mount 140, in some embodiments, is mounted to a front outer surface of mounting body 110 and functions to securely couple workstation 100 to utility vehicle 102 by resisting rearward rotation of workstation 100 out of the rear recess and bagwells (if present) of utility vehicle 102. In some embodiments, compression mount 140 is a turnbuckle, wherein the user may regulate the length of compression mount 140 between two canopy supports 141. In some embodiments, compression mount 140 may comprise a compressed spring which transmits an outward force through elements of compression mount 140 against canopy supports 141. In some embodiments, compression mount 140 is a unitary member which is coupled to canopy supports 141 using a fastener, such as a screw, a bolt, or the like. In some embodiments, compression mount 140 couples to a structure on utility vehicle other than canopy support 141. In some embodiments, compression mount 140 couples to a seat back support of utility vehicle 102. In some embodiments, compression mount 140 couples to any suitable structure or combination of structures of utility vehicle 102.

Figure 14:
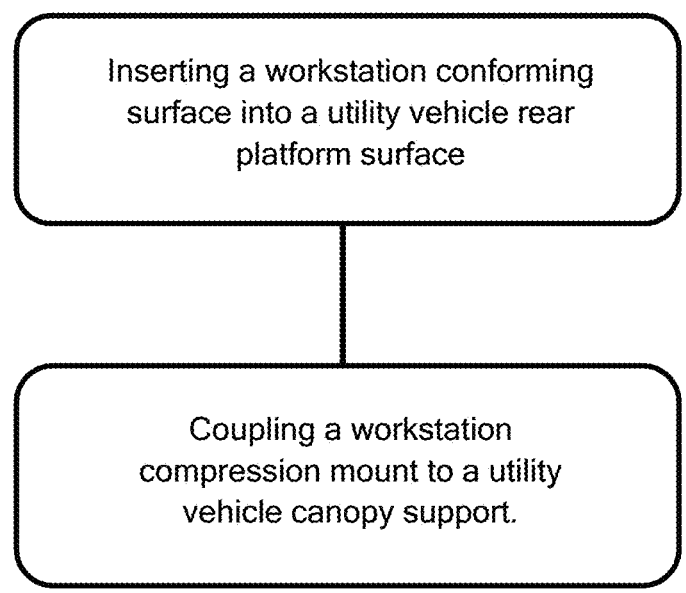
FIG. 14 is a flowchart diagraming steps of method of coupling a configurable workstation to a utility vehicle.

FIG. 14 is flowchart diagraming steps of method 200 of coupling a configurable workstation to a utility vehicle, according to the invention. Step 210 of method 200 comprises inserting a workstation conforming surface into a utility vehicle rear platform surface. This Step 210 may include inserting a bagwell interlock within a bagwell formed in the rear platform surface of a golf cart. Step 220 of method 200 comprises coupling a workstation compression mount to a utility vehicle canopy support. Method 200 may include other steps, such as, but not limited to, removeably coupling a module within a mounting body of the workstation; coupling an upper portion of the workstation to a lower portion of the workstation; and coupling a work surface to the workstation.

Figure 15:
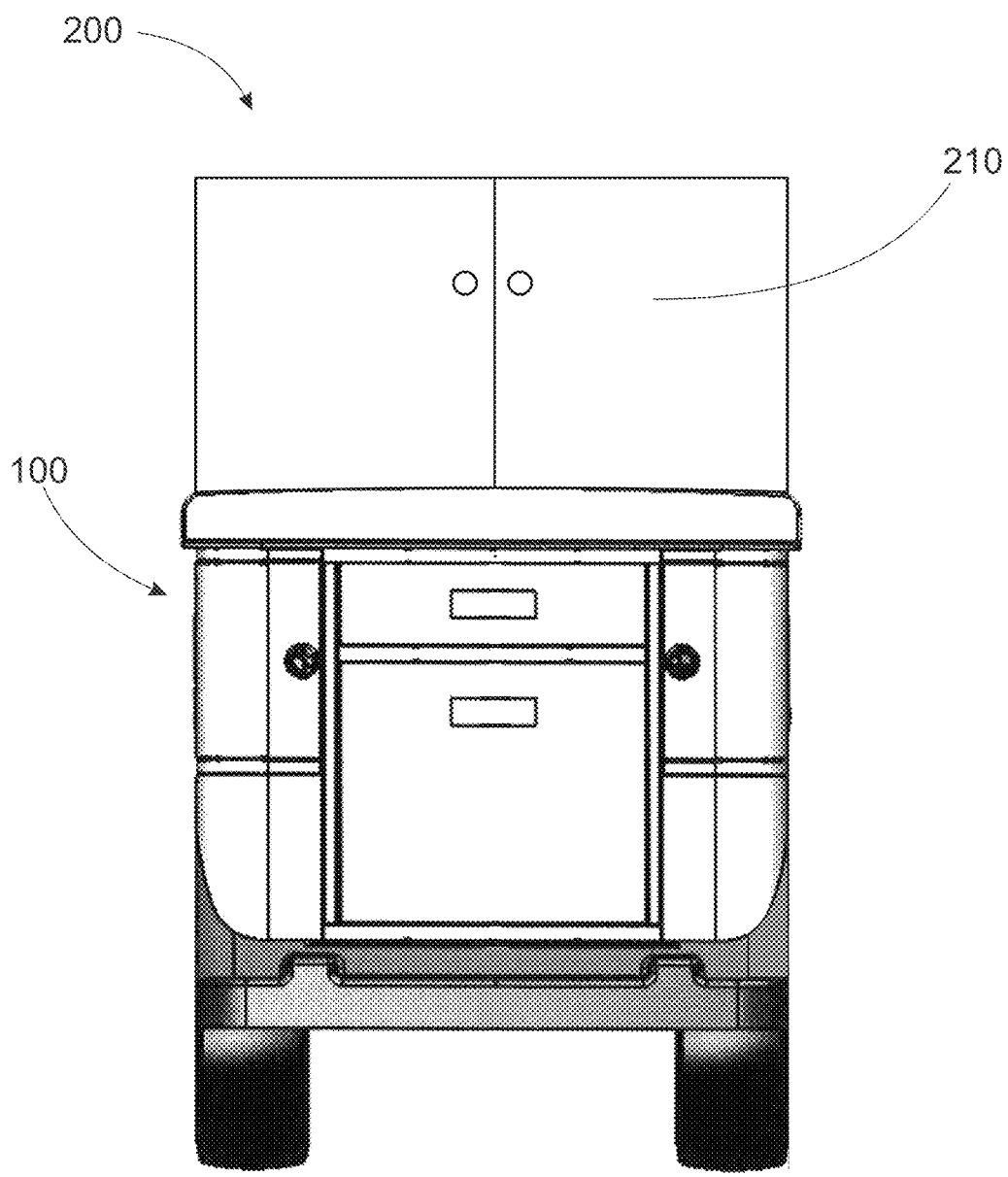
FIG. 15 is a rear elevation view of configurable workstation coupled to utility vehicle.

FIG. 15 is a rear elevation view of configurable workstation 200 coupled to utility vehicle 102, according to the invention. The workstation 200 may include a lower portion 100 and a upper portion 210 coupled to the lower portion 100. Various configurations of the upper portion 200 may be utilized, while a simple two door cabinet is shown in in FIG. 15. Additionally, FIG. 15 shows the shape of workstation 200, in some embodiments, generally bounding a maximal amount of overall storage space while generally conforming to the outer lines of vehicle 102 for stability when operating vehicle 102.

A utility vehicle configurable workstation has been described. The configurable workstation attaches to any golf cart or similar utility vehicle to transform the vehicle into a mobile workstation with customizable features. The configurable workstation provides a system and method for transporting tools and a work surface on an large indoor or outdoor property where a portable worksite is beneficial. The configurable workstation provides compartments to store and secure tools, supplies, and other items for transport and use at a temporary worksite. The configurable workstation provides includes an interchangeable work surface customizable for multiple applications. The configurable workstation includes removable modules that can be removed and reconfigured by the user to customize the configurable workstation. It is to be understood that the embodiment of the configurable workstation according to the invention as shown and described is an example only and that many other embodiments of a configurable workstation according to the invention are possible and envisioned.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A utility vehicle configurable workstation comprising:
 a mounting body with an opening and an inner volume; and
 a module inserted through the opening into the inner volume bounded by the mounting body and retained therein, wherein the mounting body engages with a utility vehicle rear platform surface, wherein the module is a removable, customizable, and interchangeable module of a set of modules including a set of drawers, a cabinet, a bin, or any combination of drawers, cabinets, or bins, and wherein only one surface of the module is exposed when inserted and retained within the mounting body.

2. The workstation of claim 1, wherein the mounting body further comprises a bagwell interlock protruding downward therefrom, wherein the bagwell interlock engages with and extends into a bagwell formed in the utility vehicle rear platform surface such that the workstation is resistant to tipping relative to the utility vehicle due to the bagwell interlock engaging with and extending into the bagwell.

3. The workstation of claim 2 wherein the bagwell interlock operates as the sole securing device to retain the workstation in the utility vehicle.

4. The workstation of claim 1, wherein the workstation further comprises side cabinet coupled to the mounting body.

5. The workstation of claim 1, further comprising:
 a substantially horizontal work surface coupled to the mounting body; and
 a backsplash extending vertically along a forward edge of the work surface.

6. The workstation of claim 1, wherein the workstation further comprises a conforming surface.

7. The workstation of claim 1, wherein the workstation further comprises a fairing coupled to the mounting body.

8. The workstation of claim 1, wherein the workstation is coupled to a utility vehicle.

9. The workstation of claim 1, wherein the utility vehicle is a golf cart.

10. A golf cart with a configurable workstation comprising:
 a golf cart having a rear platform and a bagwell formed in the rear platform;
 a removable, modular workstation comprising:
  a mounting body comprising:
   an opening;
   an inner volume; and
   a bagwell interlock protruding downward from the mounting body;
  a module inserted through the opening into the inner volume bounded by the mounting body and retained therein, wherein the bagwell interlock of the mounting body engages and extends into the bagwell of the golf cart such that the workstation is resistant to tipping relative to the golf cart due to the bagwell interlock engaging with and extending into the bagwell, wherein the module is a removable, customizable, and interchangeable module of a set of modules including a set of drawers, a cabinet, a bin, or any combination of drawers, cabinets, or bins, and wherein only one surface of the module is exposed when inserted and retained within the mounting body; and a substantially horizontal work surface coupled to the mounting body wherein the work surface includes at least one protrusion extending from a bottom surface and the mounting body includes a recess formed in a top surface of the mounting body, wherein the recess of the mounting body receives the protrusion of the work surface within the recess when the work surface is coupled to the mounting body.

11. The golf cart of claim 10, wherein the workstation further comprises side cabinet coupled to the mounting body.

12. The golf cart of claim 10, further comprising:
a backsplash extending vertically along a forward edge of the work surface.

13. The golf cart of claim 10, wherein the workstation further comprises a conforming surface.

14. The golf cart of claim 10, wherein the workstation further comprises a fairing coupled to the mounting body.

15. The golf cart of claim 10, wherein the workstation further comprises an upper portion coupled to a lower portion, wherein the upper portion comprises a set of drawers, a cabinet, a bin, or any combination of drawers, cabinets, or bins, wherein the lower portion comprises the bagwell interlock.

16. The workstation of claim 10 wherein the bagwell interlock operates as the sole securing device to retain the workstation in the golf cart.

* * * * *